United States Patent
Harada et al.

(10) Patent No.: US 7,136,584 B2
(45) Date of Patent: Nov. 14, 2006

(54) OPTICAL OUTPUT POWER AUTOMATIC ATTENUATION CIRCUIT FOR OPTICAL COMMUNICATION APPARATUS

(75) Inventors: Keisuke Harada, Yokohama (JP);
Yoshitaka Eguchi, Yokohama (JP);
Satoru Miyazaki, Yokohama (JP);
Hiroshi Oikawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 30 days.

(21) Appl. No.: 11/085,543

(22) Filed: Mar. 22, 2005

(65) Prior Publication Data

US 2006/0098270 A1    May 11, 2006

(30) Foreign Application Priority Data

Nov. 5, 2004    (JP) .............................. 2004-322265

(51) Int. Cl.
*H04B 10/08*    (2006.01)
(52) U.S. Cl. ....................................................... 398/15
(58) Field of Classification Search ................... 398/15
See application file for complete search history.

(56) References Cited

U.S. PATENT DOCUMENTS

| | | | | |
|---|---|---|---|---|
| 4,994,675 A | * | 2/1991 | Levin et al. ................. | 250/551 |
| 5,287,211 A | * | 2/1994 | Grimes et al. ............... | 398/162 |
| 5,491,572 A | * | 2/1996 | Ohara .......................... | 398/15 |
| 5,528,409 A | * | 6/1996 | Cucci et al. .................. | 398/15 |
| 5,978,415 A | * | 11/1999 | Kobayashi et al. .......... | 375/230 |
| 6,233,073 B1 | * | 5/2001 | Bowers et al. ................ | 398/16 |
| 6,314,144 B1 | * | 11/2001 | Moriyama et al. .......... | 375/316 |
| 6,359,708 B1 | * | 3/2002 | Goel et al. .................... | 398/15 |
| 6,504,630 B1 | * | 1/2003 | Czarnocha et al. ........... | 398/15 |
| 6,594,043 B1 | * | 7/2003 | Bloom et al. ................. | 398/15 |
| 6,634,807 B1 | * | 10/2003 | Al-Salameh et al. ........... | 398/9 |
| 7,039,313 B1 | * | 5/2006 | Casanova et al. ............. | 398/18 |
| 2002/0061165 A1 | * | 5/2002 | Kawarai ....................... | 385/24 |
| 2004/0047628 A1 | * | 3/2004 | Passier et al. ................. | 398/15 |

FOREIGN PATENT DOCUMENTS

| | | |
|---|---|---|
| JP | 5-134790 | 6/1993 |
| JP | 2001-358657 | 12/2001 |
| JP | 3478247 | 10/2003 |

* cited by examiner

*Primary Examiner*—Deandra M. Hughes
(74) *Attorney, Agent, or Firm*—Staas & Halsey LLP

(57) ABSTRACT

An optical amplifier to which an optical output power automatic attenuation circuit according to the present invention is applied, comprises: one amplifier board to and from which a WDM light is input and output; and a plurality of booster boards which supply pumping lights to the amplifier board, an ID pattern generated in an ID pattern generating circuit disposed in each of the booster boards is superposed on the pumping light to be sent to the amplifier board, an electric signal indicating a monitoring result of the pumping light in a light receiver disposed on the amplifier board is transmitted to each of the booster boards, it is detected in an ID coincidence detection circuit in each of the booster boards whether or not a received ID pattern contained in the electric signal is coincident with the generated ID pattern, and a connection condition of an output fiber is judged according to the detection result so that an output level of the pumping light is controlled. Thus, it is possible to detect with a simple configuration the erroneous connection of an optical fiber between each of a plurality of transmission sections and a reception section, thereby reliably preventing the light of high power from being emitted to the outside.

10 Claims, 13 Drawing Sheets

6 BITS: 4 PATTERNS

7 BITS: 5 PATTERNS

HHHLLLL
HHLHLLL
HHLLHLL
HHLLLHL
HLHLHLL

8 BITS: 10 PATTERNS

HHHHLLLL
HHHLHLLL
HHHLLHLL
HHHLLLHL
HHLHHLLL
HHLLHHLL
HHLHLHLL
HHLHLLHL
HHLLHLHL
HLHLHLHL

25
ID COINCIDENCE
DETECTION CIRCUIT

OPTICAL OUTPUT POWER AUTOMATIC ATTENUATION CIRCUIT FOR OPTICAL COMMUNICATION APPARATUS

BACKGROUND OF THE INVENTION (1) Field of the Invention

The present invention relates to an optical output power automatic attenuation circuit for monitoring the disconnection and the erroneous connection of optical fibers in an optical communication apparatus to prevent a light of high power from being emitted to the outside.

(2) Related Art

FIG. 15 is a configuration diagram showing one example of a typical optical communication system. This optical communication system is configured such that a transmission side terminal apparatus 110 and a reception side terminal apparatus 120 are connected to each other by a transmission path 130 laid on the seated or the like, and also a plurality of repeaters 140 is arranged on the transmission path 130. In the transmission side terminal apparatus 110, a plurality of optical signals of different wavelengths output from an optical sender (OS) 111 is multiplexed by a multiplexer 112 to become a wavelength division multiplexed (WDM) light, and the output power of the WDM light is controlled by an optical amplifier 113 and a supervisory control section 114 so that the input power to the repeater 140 reaches a required level, to be output to the transmission path 130.

FIG. 16 is a configuration example of a conventional optical amplifier disposed in the terminal apparatus or the repeater of the optical communication system as described above. In the optical amplifier of FIG. 16, a WDM light input to a signal light input terminal $Ts_{IN}$ of an amplifier board 210 is propagated sequentially through erbium-doped fibers (EDF) 211 and 212 serving as amplification media. Pumping lights Lp respectively output from a plurality of booster boards 220A to 220C, and 220A' to 220C' are injected to the EDFs 211 and 212 via pumping light input terminals $Tp_A$ to $Tp_C$ and $Tp_A'$ to $Tp_C'$. Thus, the WDM light Ls is amplified when passing through the EDFs 211 and 212, to be output from a signal light output terminal $Ts_{OUT}$. At this time, as the pumping light Lp supplied to the amplifier board 210 from each of the booster boards 220A to 220C and 220A' to 220C', there is used a laser light belonging to the hazard class 3B in conformity with IEC 60825 which is the International standards of laser products, CENELEC standards (EN60825-1), and JIS standards (JISC6802). Therefore, in the case where any one of optical fibers, which are connected respectively from the respective booster boards 220A to 220C and 220A' to 220C', to the pumping light input terminals $Tp_A$ to $Tp_C$ and $Tp_A'$ to $Tp_C'$, is artificially pulled out, the high power pumping light Lp of the hazard class 3B is emitted into the air. In such a case, on the laser standards described above, there is required the safety designing to attenuate the pumping light Lp to the safety level such as the hazard class 1 at which a human bodies are not affected by the pumping light Lp.

FIG. 17 is a diagram showing an essential configuration of a conventional optical amplifier provided with an optical output power automatic attenuating function. As shown in the left side of FIG. 17, if an optical fiber connected from a booster board 220 to an amplifier board 210 is pulled out from a pumping light input terminal Tp, the pumping light Lp is not received by an optical coupler 215 and a light receiver (PD) 216 which are disposed on the amplifier board 210 side for monitoring the pumping light Lp input to the amplifier board 210, and an electric signal Sm indicating information of the non-reception is transmitted from the light receiver 210 on the amplifier board 210 side to a level monitoring circuit 223 on the booster board 220 side. The level monitoring circuit 223 recognizes that the optical fiber is not connected in the case where the light receiving level of the light receiver 216 reaches a threshold or less, and transmits information of disconnection to a LD control circuit 222. The LD control circuit 222 controls a pumping light source (LD) 221 so that an output from the pumping light source 221 becomes the safety level, in accordance with the information from the level monitoring circuit 223. Then, as shown in the right side of FIG. 17, when the optical fiber from the booster board 220 is connected to the input terminal Tp of the amplifier board 210, the light receiver 216 in the amplifier board 210 receives the pumping light Lp of the safety level, so that information of the reception is transmitted via the electric signal Sm to the level monitoring circuit 223 on the booster board 220 side. In the level monitoring circuit 223, the connection of the output fiber is recognized based on the light receiving level of the light receiver 216, and information of the connection is transmitted from the level monitoring circuit 223 to the LD control circuit 222, so that the pumping light source 221 outputs the pumping light Lp of the normal operational level. As described above, in the conventional optical amplifier, there has been applied a function (closed loop control) of automatically attenuating and returning the output level of the pumping light source 291 by the disconnection and connection of the optical fiber, to perform the safety measure.

A submarine cable communication enables an economic construction of a large capacity transmission system by applying an optical amplification repeating technology, and serves an important role as means for data communications such as the Internet and the like, and also means for international internal communication for which demands are increased. However, in order to realize the long distance and large capacity transmission, it becomes necessary to design an in-line amplifier to have the high power, and accompanied with this, an increase in the pumping light output level from the booster boards, an increase in the numbers of booster boards and the like will be expected in the future. Therefore, there is a demand for the establishment of the safety designing for the high power output.

To such a demand, the dosed loop control applied to the above described conventional optical amplifier has a problem in that there is a possibility that the pumping light of high power is erroneously emitted into the air in the case where the optical fiber is erroneously connected.

Namely, as shown in FIG. 18 for example, it is provided that a connection end of an output fiber of a booster board 220A to an amplifier board 210 is disconnected, and a connection end of an output fiber of a booster board 220B to the amplifier board 210 is erroneously connected to a pumping light input terminal $Tp_A$ on the booster board 220A side. In such a case, if the attention is made on the booster board 220B side, since a pumping light input terminal $Tp_B$ is in a disconnection state, a light receiver 216B in the amplifier board 210 does not receive the pumping light Lp, and information indicating the non-reception state is transmitted from the light receiver 216B to a level monitoring circuit 223B of the booster board 220B. The level monitoring circuit 223B recognizes that the optical fiber is not correctly connected to the pumping light input terminal $Tp_B$, according to the information from the light receiver 216B, to transmit the recognition result to a LD control circuit 222B. As a result, the LD control circuit 222B controls a pumping light source 221B so that an output of a pumping light source 221B becomes the safety level.

On the other hand, on the booster board 220A side, a light receiver 216A in the amplifier board 210 receives a light of safety level from the booster board 220B, and information indicating the light receiving state is transmitted from the light receiver 216A to a level monitoring circuit 223A of the booster board 220A. The level monitoring circuit 223A erroneously recognizes that the optical fiber is correctly connected to the pumping light input terminal $Tp_A$, according to the information from the light receiver 216A, to transmit the recognition result to a LD control circuit 222A. The LD control circuit 222A controls a pumping light source 221 A so that an output of the pumping light source 221 A becomes the normal operation level. As a result, there is a possibility that the pumping light of high power belonging to the hazard class 3B is emitted into the air.

In order to solve the above problems related to the conventional dosed loop control, as shown in FIG. 19 for example, in a transmission section (for example, transmission terminal station) 300, there are disposed a transmission side ID generating section 301 that generates connection management information (ID), and a transmitted light control section 302 that switches a transmitted light to the connection management information generated in the ID generating section 301 according to an erroneous connection monitoring request Further, in a reception section (for example, a wavelength division multiplexing apparatus) 310, there are disposed a photoelectric converting section 311 that receives the connection management information from the transmission side, a reception side ID generating section 312 that generates connection management information corresponding to the transmission side, and a judging section 313 that judges whether or not the connection management information received by the photoelectric converting section 311 is coincident with the connection management information generated in the reception side ID generating section 312. Thus, it is effective that the known technology which realizes the detection of erroneous connection of the optical fiber between the transmission section 300 and the reception section 310 (refer to Japanese Patent No. 3478247, Japanese Unexamined Patent Publication No. 2001-358657 and Japanese Unexamined Patent Publication No. 5-134790) is applied to the dosed loop control of the optical amplifier.

However, in the case where the know technology as described above is applied to the dosed loop control of the optical amplifier, the configuration is such that whether or not the connection management information transmitted from the transmission section 300 to the reception section 310 is correct is judged on the reception section 310 side. Therefore, in the configuration of the optical amplifier as shown in FIG. 16, if the number of booster boards 220 corresponding to the transmission section 300 is increased, there is caused a problem in that the circuit scale of the amplifier board 210 corresponding to the reception section 310 is enlarged according to the number of booster boards. Further, since the judgment of the connection management information in the reception section 310 is performed using the connection management information generated in the reception section 310 as an expected value, there is a drawback in that the management of the connection management information to be transmitted and the management of the connection management information which becomes the expected value for the judgment on the reception side should be doubly performed.

SUMMARY OF THE INVENTION

The present invention has been accomplished in view of the above problems and has an object to provide an optical output power automatic attenuation circuit for an optical communication apparatus, capable of detecting the erroneous connection of optical fibers between a plurality of transmission sections and a reception section with a simple configuration to reliably prevent a light of high power from being emitted to the outside.

In order to achieve the above object, according to the present invention, there is provided an optical output power automatic attenuation circuit for an optical communication apparatus provided with a plurality of transmission sections each outputting a light of previously set power and a reception section including a plurality of optical input terminals which are connected to respective output terminals of the plurality of transmission sections via optical fibers on one-on-one level, wherein the power of the light input to each of the optical input terminals of the reception section is detected by each of a plurality of monitoring sections disposed in the reception section, it is judged whether or not a connection state between each of the output terminals of the plurality of transmission sections and each of the plurality of input terminals of the reception station is normal, based on the detection result in each of the monitoring sections, and when the connection state is not normal, the power of the light output from the pertinent transmission section is attenuated to a predetermined level. This optical output power automatic attenuation circuit comprises, for each of the plurality of transmission sections: an identification information generating section that generates identification information whose pattern is different for each of the transmission sections; an identification information superposing section that superposes the identification information generated in the identification information generating section on the output light; an identification information comparing section that receives an electric signal indicating the detection result in said monitoring section of the power of the light input to the pertinent optical input terminal of the reception section, and compares the identification information contained in the electric signal with the identification information generated in the identification information generating section to detect whether or not they are coincident with each other; and an output power control section that attenuates the power of the output light to the predetermined level when the anticoincidence is detected in the identification information comparing section, and then, returns the output light to the previously set power when the coincidence is detected in the identification information comparing section.

In the optical output power automatic attenuation circuit of the above configuration, in the plurality of transmission sections, the identification information generated in the identification information generating section disposed in each of the transmission sections, is superposed on the output light by the identification superposing section, and the output light containing the identification information which is different for each transmission section is sent to the reception section. The power of the light input to each of the optical input terminals of the reception section is detected by the monitoring section corresponding to each of the optical input terminals, and the electric signal indicating the detection result is given to the identification information comparing section in the pertinent transmission section. In the identification information comparing section, using the identification information generated in the identification information generating section as an expected value, the coincidence or the anticoincidence of the identification information contained in the electric signal with the expected value is detected, and in the case where the identification information contained in the electric signal is not coincident with the expected value, it is judged that the connection state of an optical fiber to the pertinent optical input terminal in the reception section is not normal, so that the power of the output light is attenuated to the predetermined level by the output power control section. Then, when the coincidence of the identification information with the expected value is detected in the identification information comparing section, it is judged that the connection state of the optical fiber to the pertinent optical input terminal in the reception section becomes normal, so that the output power is returned to the previously set power by the output power control section.

In one aspect of the above optical output power automatic attenuation circuit, the optical communication apparatus is an optical amplifier which collectively amplify a wavelength division multiplexed light containing a plurality of optical signals of different wavelengths. This optical amplifier may comprise: an amplifier board including a signal light input terminal and a signal light output terminal to and from which the wavelength division multiplexed light is input and output, amplification mediums connected between the signal light input terminal and the signal light output terminal, and a plurality of pumping light input terminals to which a plurality of pumping lights to be supplied to the amplification mediums are input; and a plurality of booster boards giving the pumping lights output from pumping light sources to the pertinent pumping light input terminals of the amplifier board to supply the pumping lights to the amplification mediums. At this time, the plurality of booster boards serves as the plurality of transmission sections, and the amplifier board serves as the reception section. Each of the identification information superposing section subjects the pumping light source to the modulation operation in accordance with the identification information generated in the identification information generating section, to superpose the identification information on the pumping light.

In another aspect of the above optical output power automatic attenuation circuit, the optical communication apparatus may be a terminal station apparatus comprising: a plurality of optical senders outputting optical signals of different wavelengths; a plurality of channel amplifiers amplifying the optical signals output from the respective optical senders for each wavelength; and a multiplexer multiplexing the optical signals output from the respective channel amplifiers to generate a wavelength division multiplexed signal light. At this time, the plurality of channel amplifiers serves as the plurality of transmission sections, and the multiplexer serves as the reception section. Each of the identification information superposing sections performs the modulation on the amplification operation of the channel amplifier in accordance with the identification information generated in the identification information generating section, to superpose the identification information on the optical signal.

According to the optical output power automatic attenuation circuit for the optical communication apparatus in the present invention as described above, both of the identification information generating section that generates the identification information, which is superposed on the output light from each of the transmission sections in order to enable the detection of erroneous connection of the optical fibers between the plurality of transmission sections and the respective optical input terminals in the reception section, and the identification information comparing section that detects the coincidence or the anticoincidence of the identification information after reception, are disposed on the transmission section side. Therefore, it is possible to effectively suppress an increase in circuit scale of the reception section even in the case where the number of transmission sections connected to the reception section is increased, and also it is possible to detect the erroneous connection between each of the transmission sections and the reception section, to thereby reliably perform a level control of the output light from each of the transmission sections. Further, since the generation of the identification information is performed only on the transmission section side, it is possible to manage the identification information in reliably easy even in the case where a large number of transmission sections is connected to the reception section.

Other objects, features, and advantages of the present invention will become apparent from the following description of the embodiments, in conjunction with the appended drawings.

DETAILED DESCRIPTION OF THE INVENTION

Figure 1:
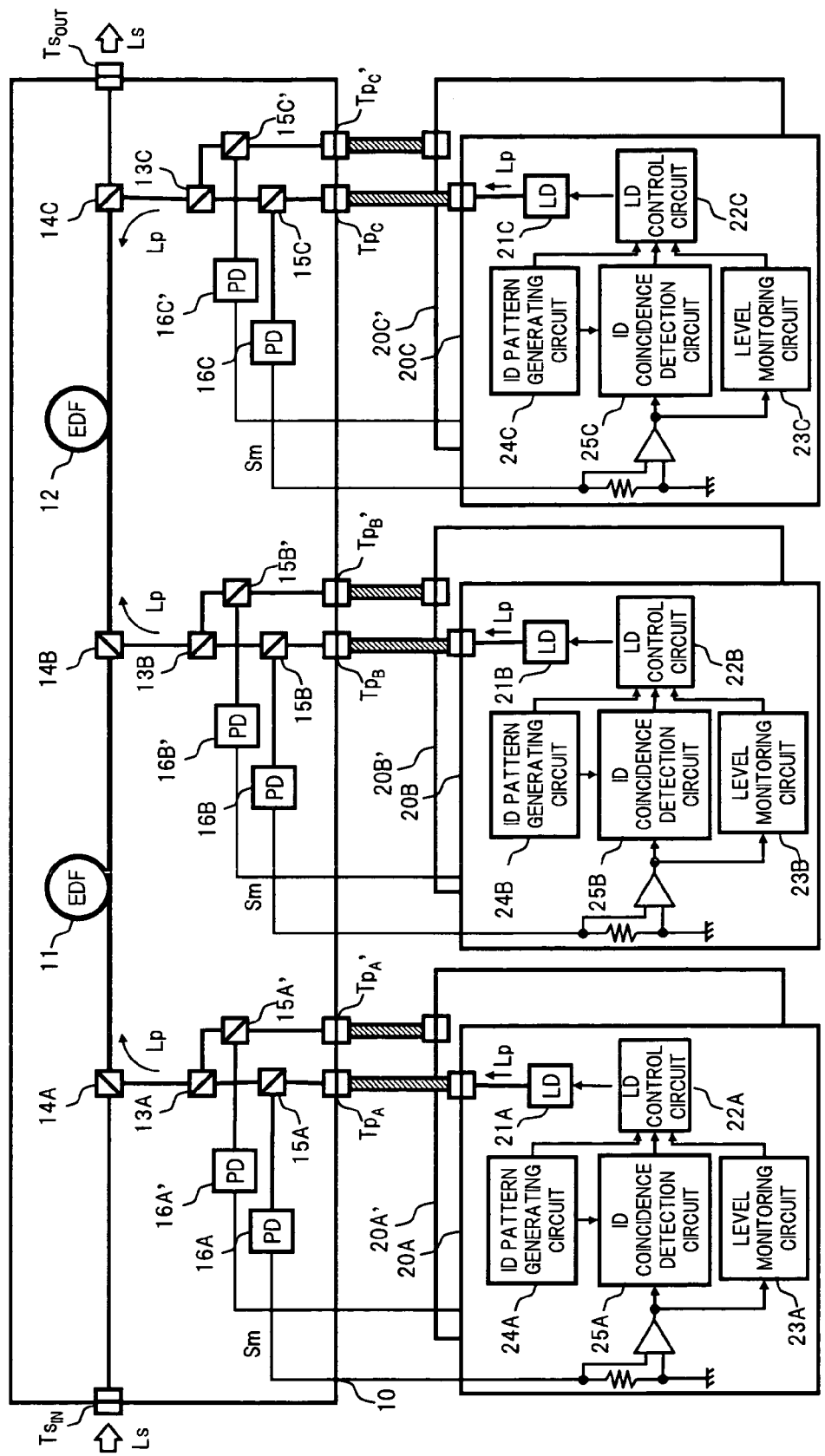
FIG. 1 is a block diagram showing a configuration of one embodiment of an optical amplifier to which an optical output power automatic attenuation circuit according to the present invention is applied.

There will be described embodiments for implementing the present invention, with reference to the accompanying drawings. The same reference numerals denote the same or equivalent parts in all drawings.

FIG. 1 is block diagram showing a configuration of one embodiment of an optical amplifier to which an optical output power automatic attenuation circuit according to the present invention is applied.

Figure 15:
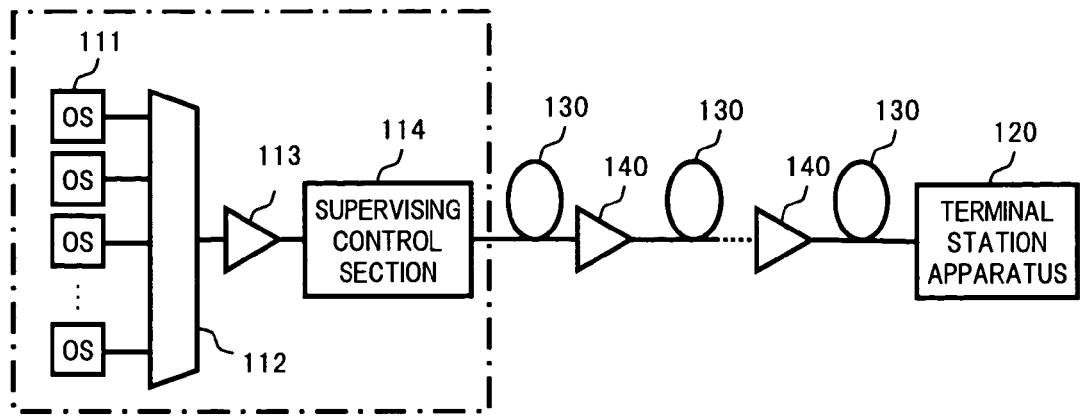
FIG. 15 is a configuration diagram of one example of a typical optical communication system.
Figure 16:
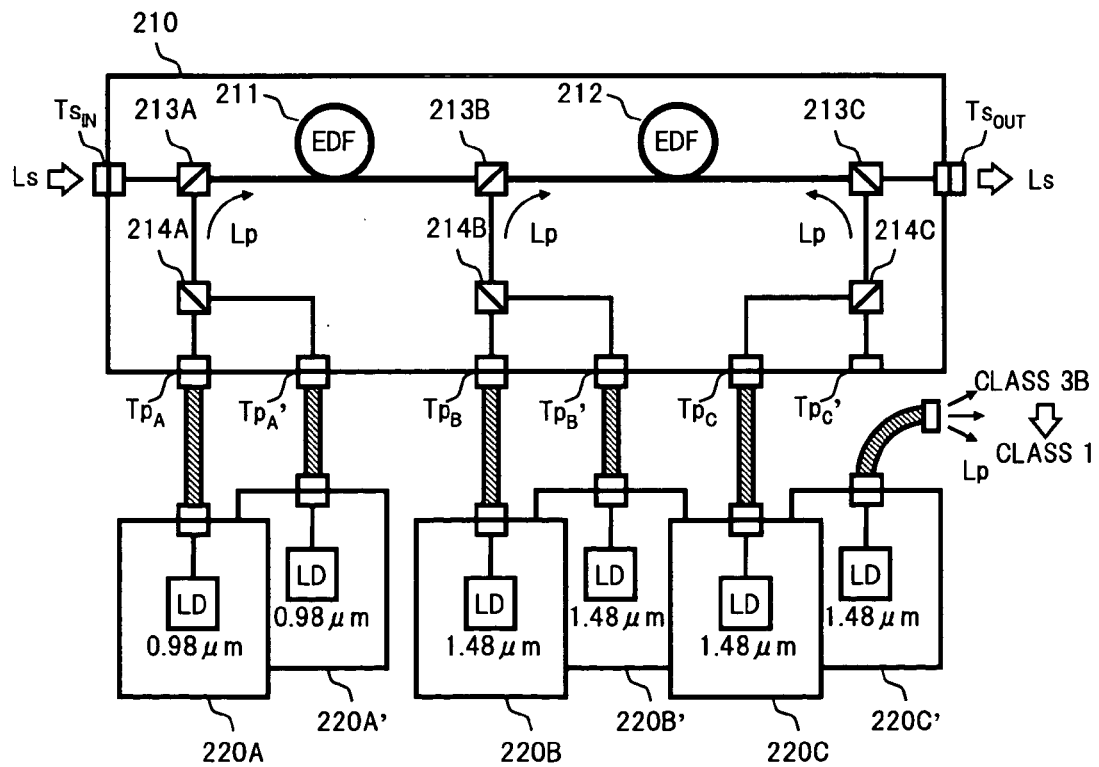
FIG. 16 is a diagram showing a configuration example of a conventional optical amplifier.
Figure 17:
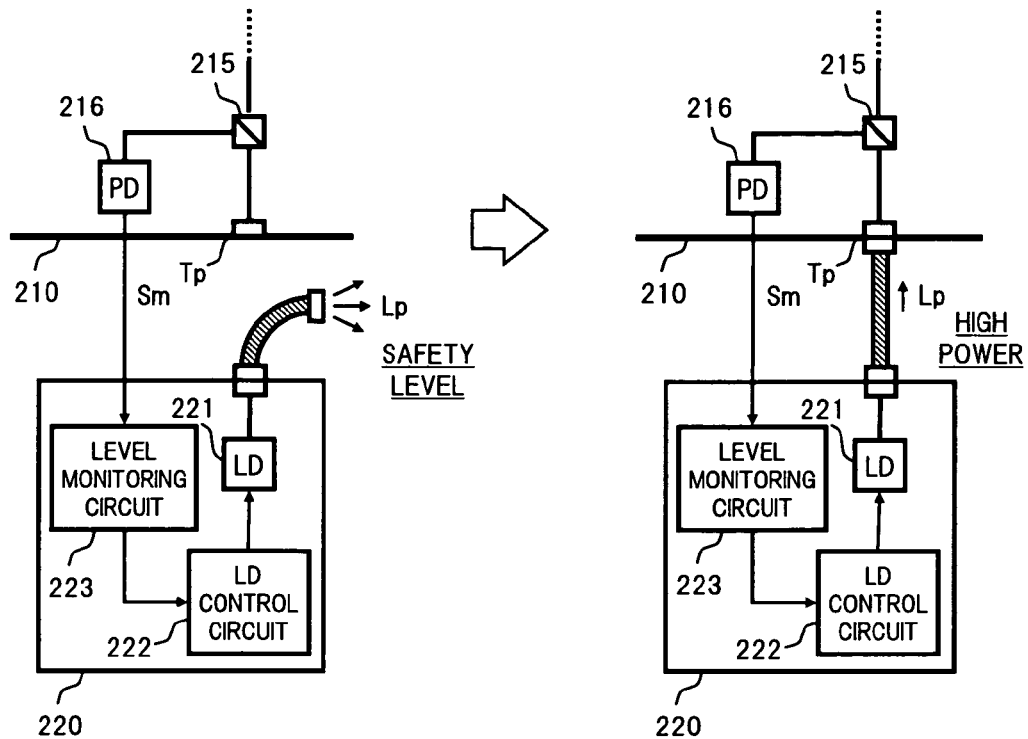
FIG. 17 is a diagram showing an essential configuration of a convention optical amplifier provided with an optical output power automatic attenuating function.
Figure 18:
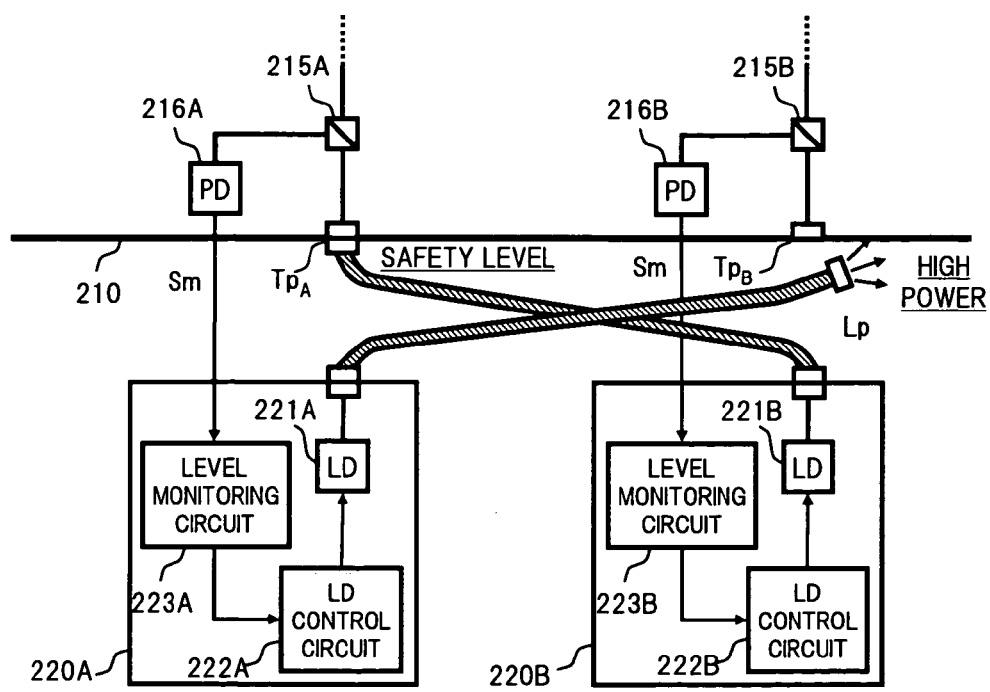
FIG. 18 is a diagram for explaining a problem of a closed loop control applied to the optical amplifier in FIG. 17.

In FIG. 1, similarly to a conventional configuration shown in FIG. 16, the optical amplifier in the present embodiment comprises: one amplifier board 10 to and from which a WDM signal light Ls is input and output; and a plurality (here, six) of booster boards 20A to 20C and 20A' to 20C' supplying pumping lights Lp to the amplifier board 10. Note, this optical amplifier is disposed inside a repeater 140 or the like, as an in-line amplifier which collectively amplifies a WDM signal light in a typical optical communication system shown in FIG. 15.

On the amplifier board 10, two erbium-doped fibers (EDFs) 11 and 12 as amplification mediums are connected in cascade between a signal light input terminal $Ts_{IN}$ and a signal light output terminal $Ts_{OUT}$. The pumping lights Lp input to pumping light input terminals $Tp_A$ and $Tp_A'$ are given to the former staged EDF 11 via an optical coupler 13A and a WDM coupler 14A. Here, the WDM coupler 14A is disposed on one end of the EDF 11 positioned on the signal light input terminal $Ts_{IN}$ side, to apply a forward pumping configuration in which the signal light Ls and the pumping light Lp are propagated through the EDF 11 in the same direction. Further, optical branching couplers 15A and 15A' are inserted into respective optical paths between the pumping light input terminals $Tp_A$ and $Tp_A'$, and the optical coupler 13A, so that a part of the pumping light Lp input to each of the pumping light input terminals $Tp_A$ and $Tp_A'$ is branched as a monitor light, to be sent to each of light receivers (PD) 16A and 16A' corresponding to each of the optical branching couplers 15A and 15A'. Each of the light receivers 16A and 16A' receives the branched light from each of the optical branching couplers 15A and 15A', and generates an electric signal Sm whose current value is changed according to the optical power of the branched light, to output the electric signal Sm to each of the booster boards 20A and 20A' sides.

To the latter staged EDF 12, the pumping lights Lp input to pumping light input terminals $Tp_B$ and $Tp_B'$ are given via an optical coupler 13B and a WDM coupler 14B, and also the pumping lights Lp input to pumping light input terminals $Tp_C$ and $Tp_C'$ are given via an optical coupler 13C and a WDM coupler 14C. Here, the WDM coupler 14B is disposed on one end of the EDF 12 positioned on the signal light input terminal $Ts_{IN}$ side, and the WDM coupler 14C is disposed on the other end of the EDF 12 positioned on the signal light output terminal $Ts_{OUT}$ side, to apply a bi-directional pumping configuration in which the pumping lights Lp are supplied to the EDF 12 in a forward direction and a backward direction. Further, optical branching couplers 15B, 15B', 15C and 15C' are inserted into respective optical paths between the pumping light input terminals $Tp_B$ and $Tp_B'$, and the optical coupler 13B, and respective optical paths between pumping light input terminals $Tp_C$ and $Tp_C'$, and the optical coupler 13C, so that a part of the pumping light Lp input to each of the pumping light input terminals $Tp_B$ and $Tp_B'$, and $Tp_C$ and $Tp_C'$ is branched as a monitor light, to be sent to each of light receivers (PD) 16B, 16B', 16C and 16C' corresponding to each of the optical branching couplers 15B, 15B', 15C and 15C'. Each of the light receivers 16B, 16B', 16C and 16C' receives the branched light from each of the optical branching couplers 15B, 15B', 15C and 15C', and generates an electric signal Sm whose current value is changed according to the optical power of the branched light, to output the electric signal Sm to each of the booster boards 20B, 20B', 20C and 20C' sides.

Here, the booster boards 20A to 20C and 20A' to 20C' are in redundant configurations in pairs, the pumping light Lp generated in either the booster board 20A or the booster board 20A' is given to the former staged EDF 11 in the amplifier board 10 as a forward pumping light. The pumping light Lp generated in either the booster board 20B or the booster board 20B' is given to the latter staged EDF 12 in the amplifier board 10 as a forward pumping light, and the pumping light Lp generated in either the booster board 20C or the booster board 20C' is given to the EDF 12 as a backward pumping light.

The booster board 20A comprises for example: a pumping light source (LD) 21A, a LD control circuit 22A, a level monitoring circuit 23A, an ID pattern generating circuit 24A and an ID coincidence detection circuit 25A. Note, each of other booster boards 20A', 20B, 20B', 20C and 20C' comprises components same as those of the booster board 20A. Therefore, in the following description, as reference numerals representing the respective booster boards and the respective components, the numerals from which final alphabetical characters are omitted are used. Further, for components of the amplifier board 10 corresponding to each booster board, similarly to the above, there are cases where representing reference numerals are used.

The pumping light source 21 is a typical light source using a semiconductor laser or the like, generating, for example, the pumping light Lp of 0.98 μm band or 1.48 μm band. The LD control circuit 22 adjusts a driving condition of the pumping light source 21 according to respective output signals from the level monitoring circuit 23, the ID pattern generating circuit 24 and the ID coincidence detection circuit 25, to control the pumping light Lp output from the booster board 20. The feature of the pumping light Lp control by the LD control circuit 22 is in that the power of the pumping light Lp is switched to the safety level in the case where an output fiber of the booster board 20 is disconnected or erroneously connected as described later, and at the same time, the identification information (to be referred to as ID pattern) whose pattern is different for each booster board 20 is superposed on the pumping light Lp, and then, when the output fiber is correctly connected, the superposition of the ID pattern is stopped, so that the power of the pumping light Lp is returned to the normal operation level.

The level monitoring circuit 23 receives the electric signal Sm which is transmitted from the pertinent light receiver 16 in the amplifier board 10 and subjected to the current-voltage conversion, and based on a level of the signal input thereto, detects the power of the pumping light Lp given to the amplifier board 10 from the booster board 20, to output the detection result to the LD control circuit 22. The ID pattern generating circuit 24 generates an ID pattern which is different for each of the booster boards described above, and outputs a signal indicating the ID pattern to the LD control circuit 22 and the ID coincidence detection circuit 25. The ID coincidence detection circuit 25 receives the electric signal Sm which is transmitted from the pertinent light receiver 16 in the amplifier board 10 and subjected to the current-voltage conversion, identifies an ID pattern (to be referred to as received ID pattern hereinafter) superposed on the pumping light Lp received by the light receiver 16 based on a level change in the signal input thereto, compares the received ID pattern with the ID pattern (referred to as generated ID pattern hereinafter) indicated by the output signal from the ID pattern generating circuit 24, and detects whether or not both of the ID patterns are coincident with each other, to output a signal indicating the detection result to the LD drive circuit 22.

Accordingly, in the present embodiment, the ID pattern generating circuit 24 corresponds to an identification information generating section, the ID coincidence detection circuit 25 corresponds to an identification information comparing section, and the pumping light source 21 and the LD control circuit 22 are respectively provided with functions as an identification information superposing section and an output power control section.

Figure 2:
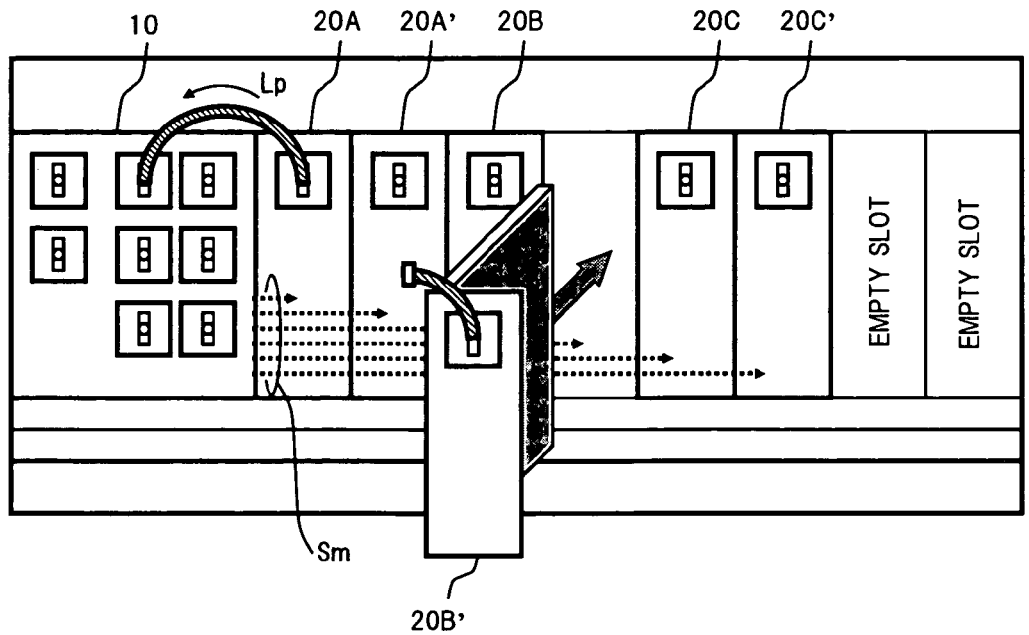
FIG. 2 is a diagram exemplary showing a mounting state of an amplifier board and booster boards in the embodiment.

Note, as shown in FIG. 2 for example, the amplifier board 10 and the respective booster boards 20 of the above configurations are mounted on empty slots of a rack 1, and an optical fiber connected to an output terminal of each of the booster boards 20 is connected to the pertinent pumping light input terminal Tp of the amplifier board 10. Further, the transfer of the electric signal Sm from the amplifier board 10 to each of the booster boards 20 is performed via a back wiring board (BWB) which is not shown in the figure, or the like.

Further, although not shown in the configuration example of FIG. 1, similarly to a typical optical amplifier, the amplifier board 10 is provided with means for monitoring the input power and output power of the signal light Ls, and also means for adjusting a supply condition of the pumping light Lp from each of the booster boards 20 based on the monitoring result of the input and output of the signal light Ls to perform a control of a main signal system, such as an automatic level control (ALC), an automatic gain control (AGC) or the like.

Here, there will be described the details of the ID pattern generating circuit 24 and the ID coincidence detection circuit 25.

It is preferable that the ID pattern generated in the ID pattern generating circuit 24 of each of the booster boards 20 is designed to be different for each booster board 20 and also satisfies the following conditions.

Mark rates of the ID patterns corresponding to the respective booster boards 20 are unified at ½.
The coincidence of patterns due to phase deviation does not occur, in order to prevent the erroneous detection in the ID coincidence detection circuit 25.
The number of bits is made minimum, in order to achieve the simplification of the ID pattern generating circuit 24.

Figure 3:
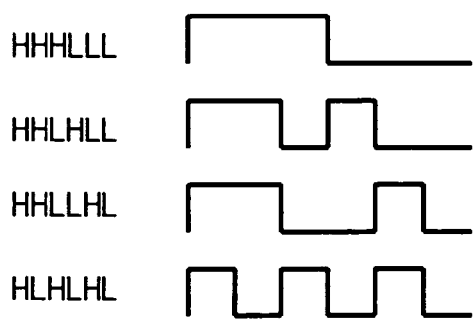
FIG. 3 is a diagram showing one example of ID pattern of 6 bits.
Figure 4:
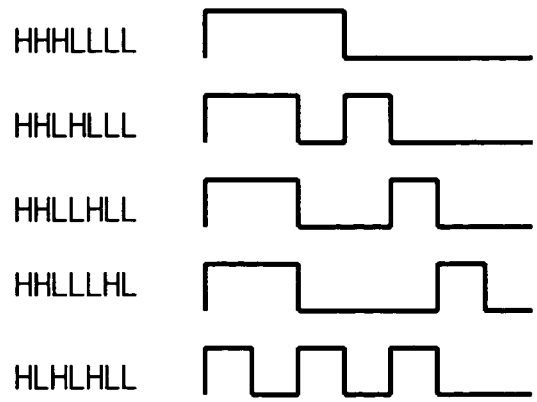
FIG. 4 is a diagram showing one example of ID pattern of 7 bits.
Figure 5:
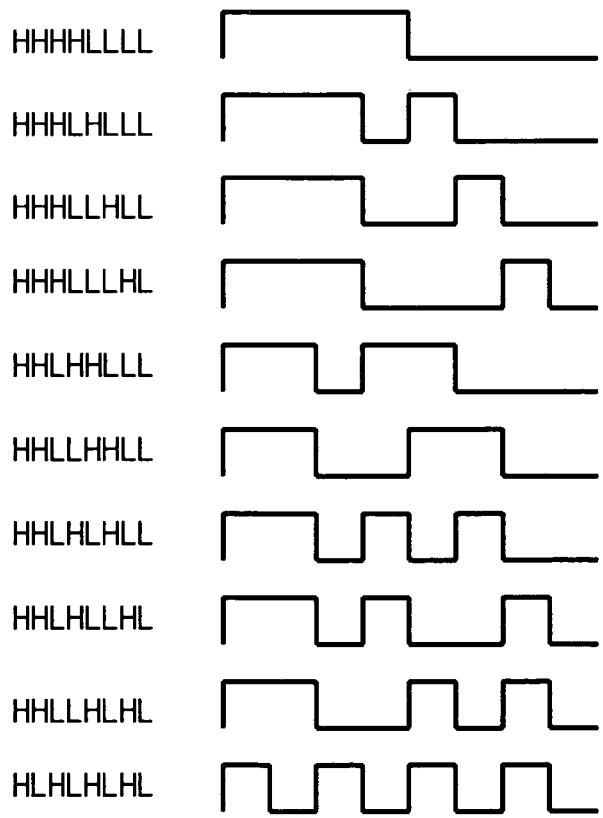
FIG. 5 is a diagram showing one example of ID pattern of 8 bits which is applicable to the embodiment.

In the case where there is embodied the ID pattern for the case of the configuration of six booster boards 20 shown in FIG. 1 considering the above designing conditions, only signals of 4 types can be created according to patterns of 6 bits as shown in FIG. 3 for example, and it is impossible to perform the designing in which the mark rate is at ½, according to patterns of 7 bits as shown in FIG. 4 for example. Therefore, it becomes possible to satisfy all the design specifications described above, by creating ID patterns of six types using patterns of 8 bits as shown in FIG. 5 for example.

Figure 6:
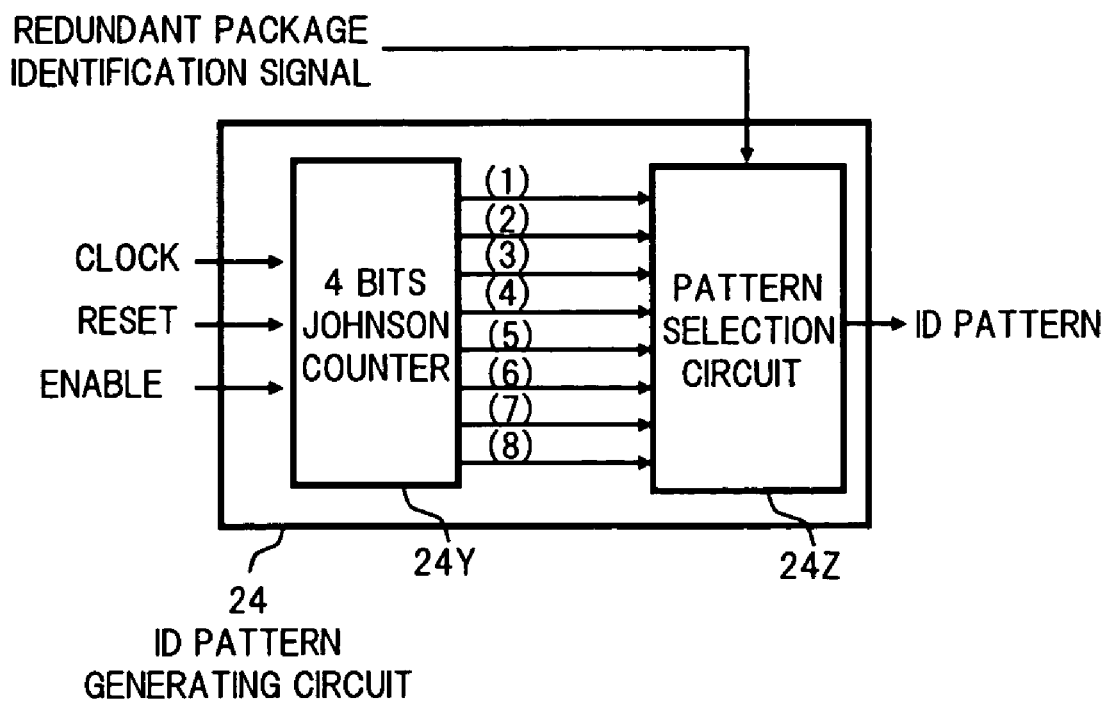
FIG. 6 is a circuit diagram showing a specific example of an ID pattern generating circuit in the embodiment.
Figure 7:
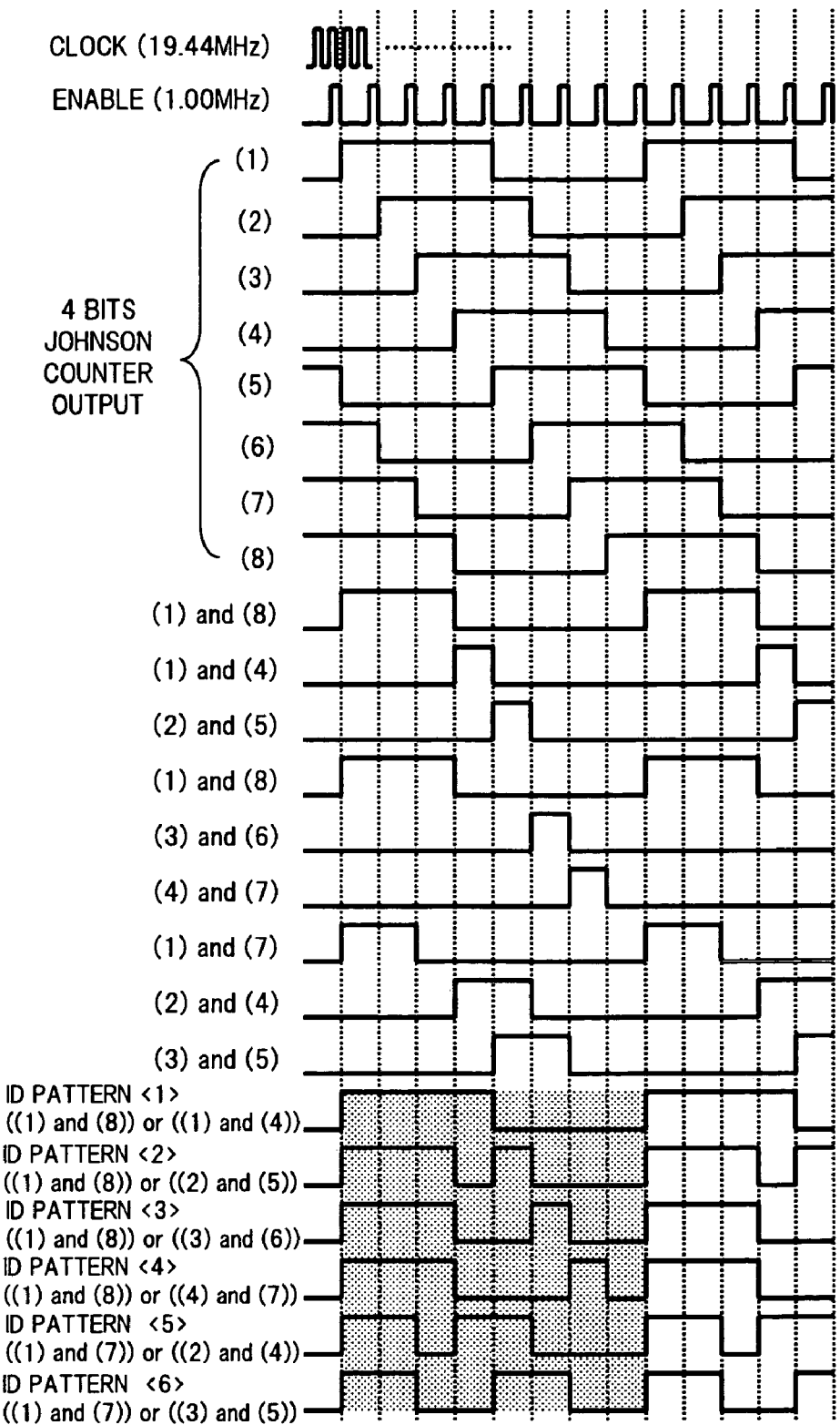
FIG. 7 is a time chart for explaining an operation in the circuit of FIG. 6.

FIG. 6 is a circuit diagram showing a specific example of the ID pattern generating circuit 24 capable of generating the ID pattern of 8 bits as described above. Further, FIG. 7 is a time chart for explaining an operation in the circuit in FIG. 6.

The ID pattern generating circuit 24 shown in FIG. 6 comprises, for example: a typical 4 bits Johnson counter 24Y; and a pattern selection circuit 24Z. The 4 bits Johnson counter 24Y is given with a dock signal (for example, 19.44 MHz frequency) as shown in first column of FIG. 7, an enable signal (for example, 1.00 kHZ frequency) as shown in second column of FIG. 7 synchronized with the dock signal, and a reset signal (not shown in the figure). Signals of waveforms as shown in third column to tenth column of FIG. 7 are respectively output from output ports (1) to (8), to be given to the pattern selection circuit 24Z The pattern selection circuit 24Z, which is able to generate the ID patterns of 6 types by combining the respective output signals from the 4 bits Johnson counter 24Y, to perform the logical operations as shown in eleventh column and the succeeding columns of FIG. 7, outputs from an output port thereof any one of ID patterns which are set to be different for each of the booster boards 20. Note, since the six booster boards 20 are made to have the redundant configurations here, as the ID pattern to be output by the pattern selection circuit 24Z of each of the booster boards 20, the ID pattern of the active booster board 20 is selected according to for example a redundant package identification signal generated on the BWB.

Figure 8:
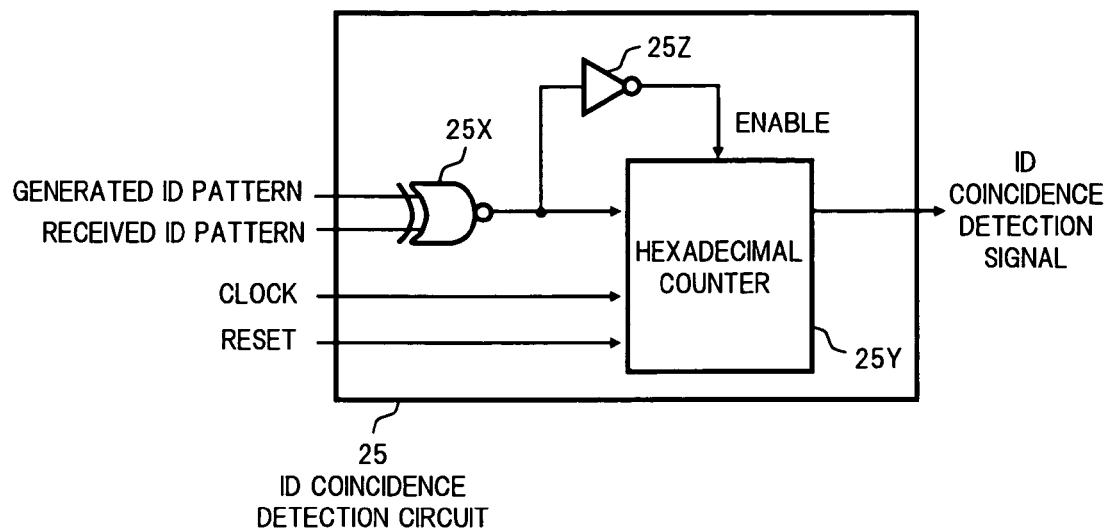
FIG. 8 is a circuit diagram showing a specific example of an ID coincidence detection circuit in the embodiment.
Figure 9:
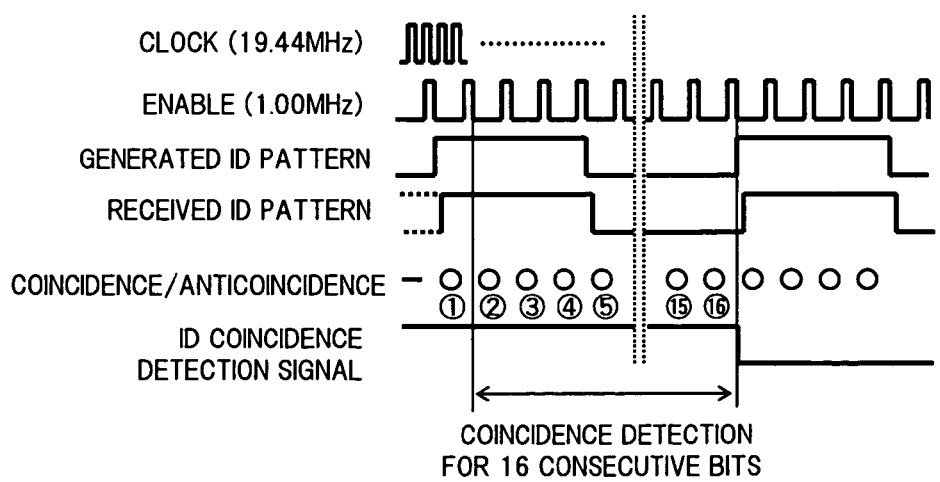
FIG. 9 is a time chart for explaining an operation in the circuit of FIG. 8.

FIG. 8 is a circuit diagram showing a configuration example of the ID coincidence detection circuit 25 corresponding to the specific examples of the ID pattern as described above. Further, FIG. 9 is a time chart for explaining an operation in the circuit in FIG. 8.

In the ID coincidence detection circuit 25 shown in FIG. 8, the negation of exclusive OR (XOR) of the received ID pattern extracted from the electric signal Sm transmitted from the light receiver 16 of the amplifier board 10 and the generated ID pattern transmitted from the ID pattern generating circuit 24 in the same booster board 20, is operated in a logic circuit 25X, and a signal indicating the operation result in the logic circuit 25X is given as a data input signal of a hexadecimal counter 25Y Note, a clock signal and an enable signal, which are given to the hexadecimal counter 25Y, are common to those in the ID pattern generating circuit 24. According to such a circuit configuration, as shown in FIG. 9, if the result of bit comparison between the received ID pattern and the generated ID pattern is coincident with each other for 16 consecutive counts, an output signal from the hexadecimal counter 25Y is shifted to a low level from a high level, so that an ID coincidence detection signal indicating the coincidence of the received ID pattern and the generated ID pattern is output to the LD control circuit 22. A relation between respective output levels of the logic circuit 25X and the hexadecimal counter 25Y corresponding to respective bit values of the received ID pattern and the generated ID pattern is summarized in the next table 1.

TABLE 1

| Received ID pattern | Generated ID pattern | Output of negation of EX-OR | ID coincidence detection signal |
| --- | --- | --- | --- |
| 1 L | L | H (coincidence) | L (coincidence) |
| 2 L | H | L (anticoincidence) | H (anticoincidence) |
| 3 H | L | L (anticoincidence) | H (anticoincidence) |
| 4 H | H | H (coincidence) | L (coincidence) |

Next, there will be described an operation of the optical amplifier according to the present invention.

Figure 10:
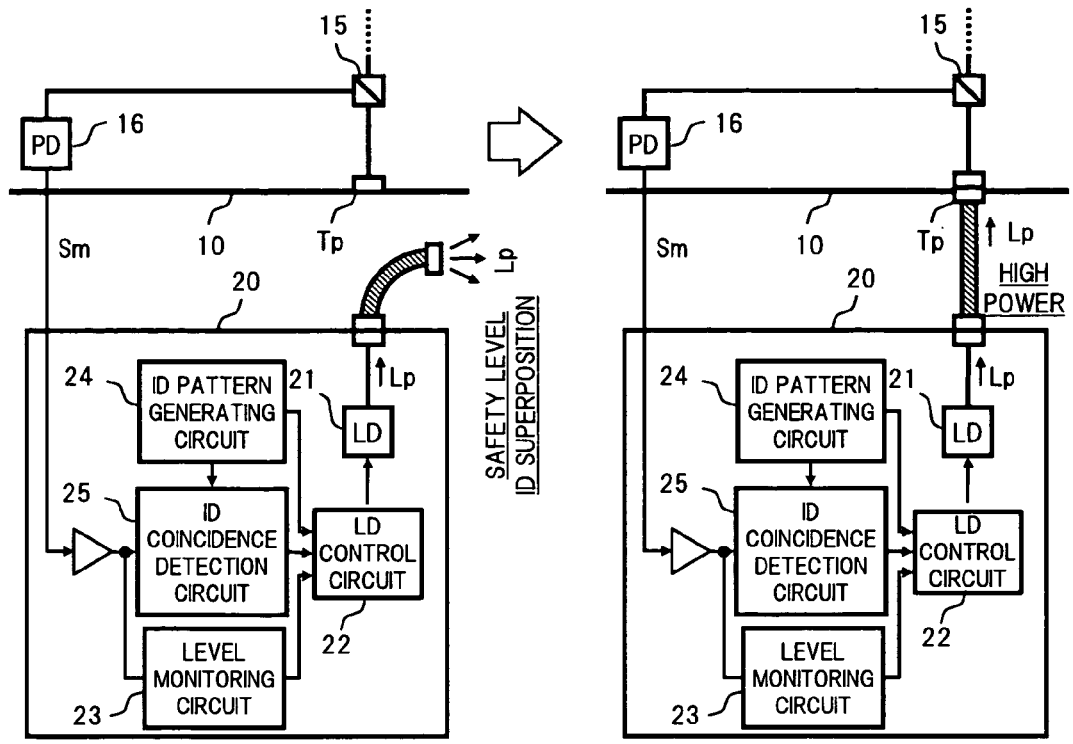
FIG. 10 is a diagram for explaining an operation in the case where an output fiber of a booster board is disconnected in the embodiment.

As shown in the left side of FIG. 10 for example, in a state where the output fiber of a certain booster board 20 is disconnected, the pumping light Lp is not received by the light receiver 16 which corresponds to this booster board 20, in the amplifier board 10, and the electric signal Sm indicating such a nonreception state is transmitted from the light receiver 16 to the level monitoring circuit 23 and ID coincidence detection circuit 25 in the booster board 20. The level monitoring circuit 23 detects that the pumping light Lp is not received by the amplifier board 10 side, based on the electric signal Sm from the light receiver 16, to output a signal indicating the detection result to the LD control circuit 22. Further, the ID coincidence detection circuit 25 outputs a signal indicating the anticoincidence with the generated ID pattern to the LD control circuit 22, since the ID pattern is not contained in the electric signal Sm from the light receiver 16. The LD control circuit 22 judges that the output fiber is not correctly connected to the pertinent pumping light input terminal Tp of the amplifier board 10, based on the output signals from the level monitoring circuit 23 and the ID coincidence detection circuit 25, to control the pumping light source 21 so that the pumping light source 21 outputs the pumping light Lp at the safety level, and also subjects the pumping light source 21 to the modulation operation in accordance with the ID pattern from the ID pattern generating circuit 24. As a result, the pumping light Lp of the safety level, on which the ID pattern is periodically superposed, is output from the output fiber.

Then, as shown in the right side of FIG. 10, when the output fiber of the booster board 20 is connected to the pumping light input terminal Tp of the amplifier board 10, the pumping light Lp of the safety level containing the ID pattern is received by the light receiver 16, and the electric signal Sm indicating the light reception state is transmitted from the light receiver 16 to the level monitoring circuit 23 and the ID coincidence detection circuit 25. The level monitoring circuit 23 detects that the pumping light Lp of the safety level is received by the amplifier board 10 side, based on the electric signal Sm from the light receiver 16, to output a signal indicating the detection result to the LD control circuit 22. Further, the ID coincidence detection circuit 25 compares the received ID pattern contained in the electric signal Sm from the light receiver 16 with the generated ID pattern from the ID pattern generating circuit 24, to output a signal indicating the coincidence of both of the ID patterns to the LD control circuit 22. The LD control circuit 22 verifies the reception of the pumping light Lp of the safety level based on the output signal from the level monitoring circuit 23 and also verifies the coincidence of the ID patterns based on the output signal from the ID coincidence detection circuit 25, to judge that the output fiber is correctly connected to the pertinent pumping light input terminal Tp of the amplifier board 10, thereby stopping the modulation operation of the pumping light source 21 in accordance with the ID pattern and also returning the pumping light source 21 to output the pumping light Lp at the normal operation level. As a result, the pumping light Lp of high power is supplied from the booster board 20 to the amplifier board 10.

Figure 11:
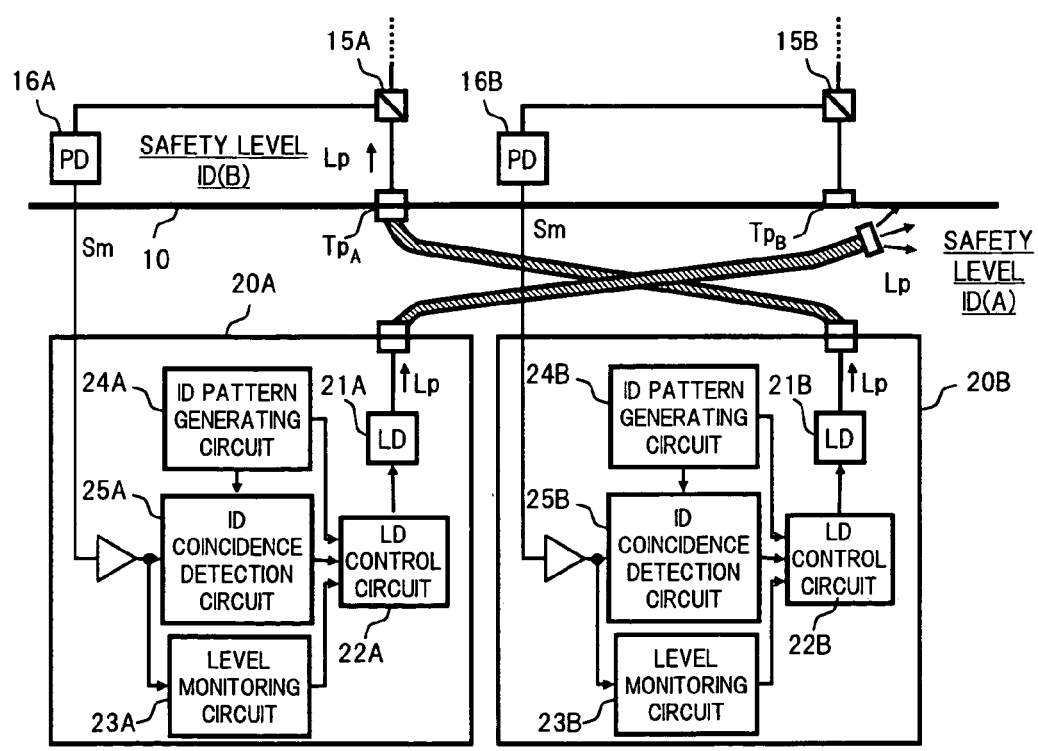
FIG. 11 is a diagram for explaining an operation in the case where the output fiber of the booster board is erroneously connected in the embodiment.

Further, as shown in FIG. 11 for example, in the case where the output fiber of the booster board 20A is disconnected, and the output fiber of the booster board 20B is erroneously connected to the pumping light input terminal $Tp_A$ which corresponds to the booster board 20A, in the amplifier board 10, since the pumping light Lp is not received the light receiver 16B which corresponds to the booster board 20B, in the amplifier board 10, the electric signal Sm indicating the non-reception state is transmitted from the light receiver 16B to the level monitoring circuit 23B and ID coincidence detection circuit 25B of the booster board 20B. The level monitoring circuit 23B detects that the pumping light Lp is not received by the amplifier board 10 side, based on the electric signal Sm from the light receiver 16B, to output a signal indicating the detection result to the LD control circuit 22B. Further, the ID coincidence detection circuit 25B outputs a signal indicating the anticoincidence with the generated ID pattern to the LD control circuit 22B, since the ID pattern is not contained in the electric signal Sm from the light receiver 16B. The LD control circuit 22B judged that the output fiber is not correctly connected to the pumping light input terminal $Tp_B$ of the amplifier board 10, based on the output signals from the level monitoring circuit 23B and the ID coincidence detection circuit 25B, to control the pumping light source 21B so that the pumping light source 21B outputs the pumping light Lp of the safety level, and also subjects the pumping light source 21 B to the modulation operation in accordance with the ID pattern from the ID pattern generating circuit 24B. As a result, the pumping light Lp of the safety level, on which the ID pattern is periodically superposed, is output from the output fiber of the booster board 20B.

On the other hand, the pumping light Lp of the safety level containing the ID pattern from the booster board 20B is received by the light receiver 16A which corresponds to the booster board 20A, in the amplifier board 10, and the electric signal Sm indicating the light reception state is transmitted from the light receiver 16A to the level monitoring circuit 23A and ID coincidence detection circuit 25A of the booster board 20A. The level monitoring circuit 23A detects that the pumping light Lp of the safety level is received by the amplifier board 10 side, based on the electric signal Sm from the light receiver 16A, to output a signal indicating the detection result to the LD control circuit 22A. Further, the ID coincidence detection circuit 25A compares the received ID pattern contained in the electric signal Sm from the light receiver 16A with the generated ID pattern from the ID pattern generating circuit 24A. At this time, since the received ID pattern corresponds to the booster board 20B, a signal indicating the anticoincidence of the ID patterns is output to the LD control circuit 22A from the ID coincidence detection circuit 25A. The LD control circuit 22A judges that the output fiber is not correctly connected to the pumping light input terminal $Tp_A$ of the amplifier board 10 by verifying the anticoincidence of the ID patterns based on the output signal from the level monitoring circuit 25A even if it verifies the reception of the pumping light Lp based on the level monitoring circuit 23A, to control the pumping light source 21A so that the pumping light source 21A outputs the pumping light Lp of the safety level, and also subjects the pumping light source 21A to the modulation operation in accordance with the ID pattern from the ID pattern generating circuit 24A. As a result, the pumping light Lp of the safety level, on which the ID pattern is periodically superposed, is output from the output fiber of the booster board 20A, so that such a situation where the pumping light Lp of high power is emitted to the outside at the erroneous connection time can be avoided.

Figure 19:
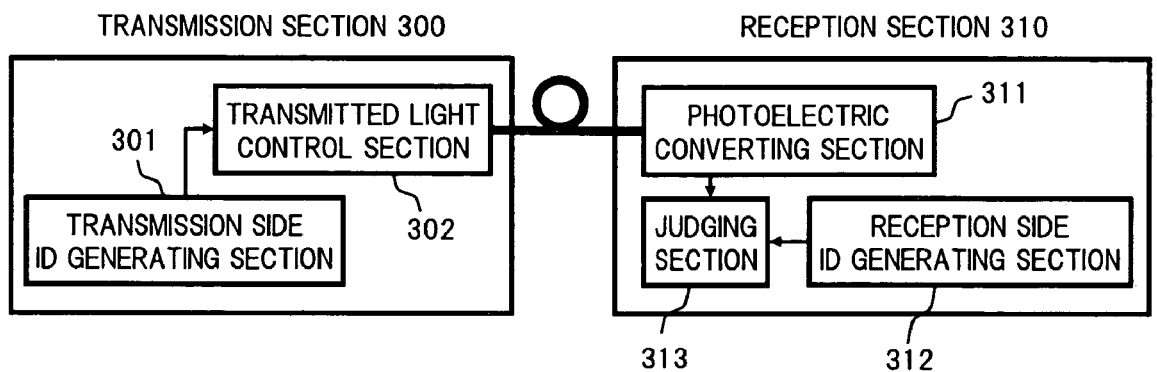
FIG. 19 is a diagram showing a configuration of a conventional apparatus which enables the detection of erroneous connection of an optical fiber between a transmission section and a reception section.

In the optical amplifier as described above, for the ID pattern which is superposed on the pumping light Lp in order to enable the detection of erroneous connection of each booster board 20 to the amplifier board 10, main components for detecting the coincidence or the anticoincidence thereof with the generated ID pattern, to be specific, the ID pattern generating circuit 24 and the ID coincidence detection circuit 25, are disposed inside each of the booster boards 20 on the pumping light Lp transmission side. Therefore, differently from a conventional technique shown in FIG. 19, the circuit scale of the reception section (amplifier board 20 here) is not enlarged even if the number of transmission sections (booster boards 20 here) is increased. If the optical branching coupler 15 and the light receiver 16 are disposed on the amplifier board 10 side so as to correspond to each pumping light input terminal Tp, it is possible to reliably perform a safety control of the pumping light Lp at the erroneous connection time even in the case the number of booster boards 20 is increased. Further, in the conventional technique, the ID information needs to be managed on both of the transmission side and the reception side. However, the optical amplifier in the present embodiment achieves an effect that the ID information may be managed only by the booster board 20 on the transmission side, and accordingly, it is possible to perform the management of the ID information in relatively easy even in the case where a large number of booster boards 20 is connected to the amplifier board 10.

Next, there will be described an application example of the above embodiment of the optical amplifier.

Figure 12:
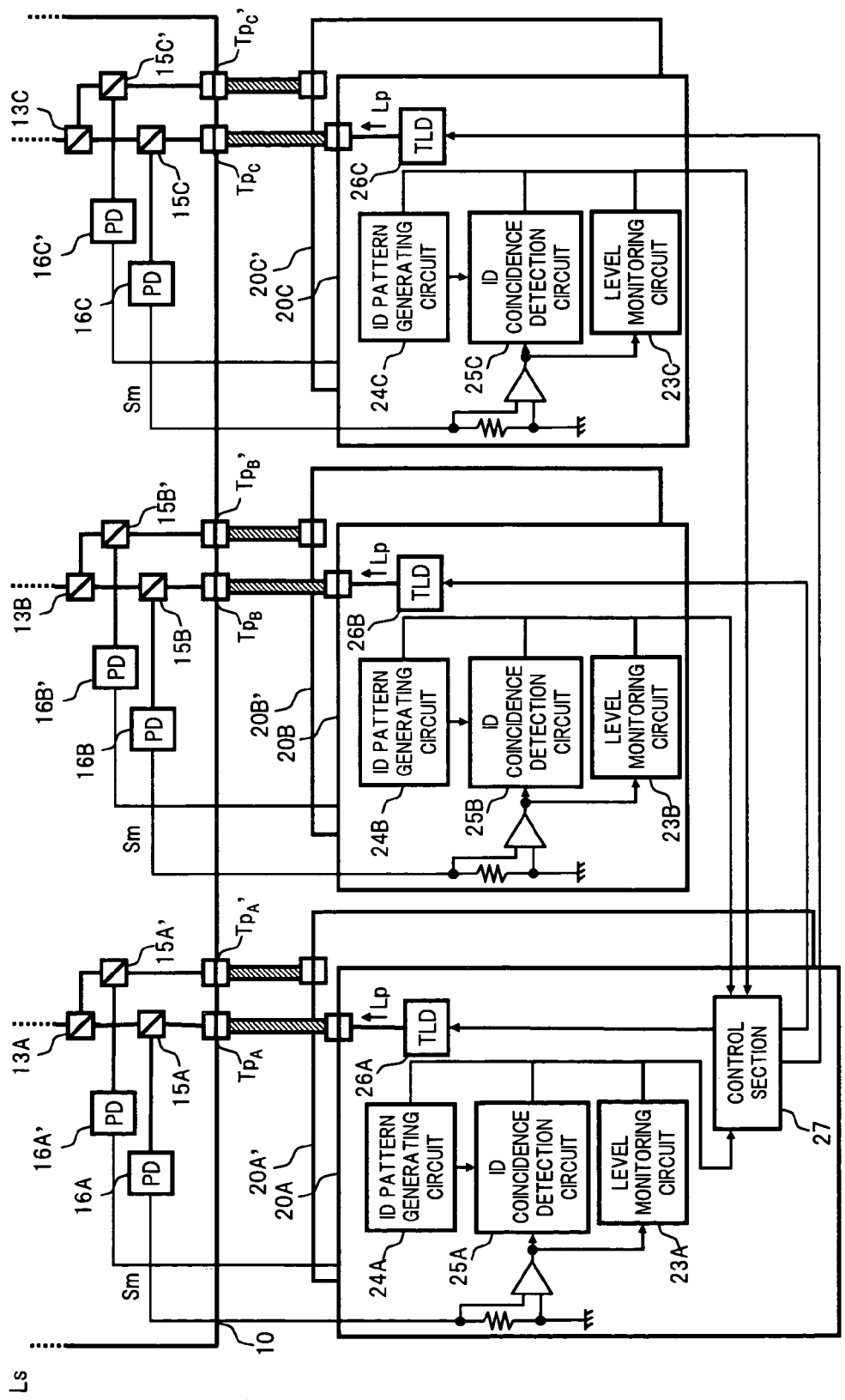
FIG. 12 is a block diagram showing a configuration of a main part in an application example related to the optical amplifier in FIG. 1.

FIG. 12 is a block diagram showing a configuration of a main part in the application example of the optical amplifier.

In FIG. 12, the configuration of the present optical amplifier differs from the configuration shown in FIG. 1 in that a tunable light source (TLD) 26 is used as the pumping light source of each of the booster boards 20, and also a control section 27 that performs a centralized control on each of the booster boards 20 is disposed on each of the booster boards 20A and 20A' serving as cores (which may be referred to as core boards hereinafter), but other booster boards 20B, 20B', 20C and 20C' are set to be controlled boards each of which is not provided with such a control section.

The wavelength and power of the pumping light Lp generated by the TLD 26 of each of the booster boards 20 are controlled in accordance with an output signal from the control section 27. In the control section 27, the reception power of the pumping light Lp at the amplifier board 10, which is monitored by the level monitoring circuit 20 of each of the booster boards 20, and the detection result of the coincidence or the anticoincidence of the ID patterns in the ID coincidence detection circuit 25 of each of the booster boards 20, are collected, and based on information thereof, the safety control of the pumping light Lp of each of the booster boards 20 at the erroneous connection time or the like is performed. Further, although especially not shown in the figure, information relating to the input and output power of the signal light monitored by the amplifier board 10 is collected by the control section 27, and also the adjustment of the pumping light power for performing the control of the main signal system, such as the ALC or the AGC, is performed by the control section 27. Accordingly, here, the control section 27 is provided with a function as a wavelength control section.

In the optical amplifier having such a configuration, when the reduction or the non-reception of the pumping light power to be received by the amplifier board 10 is detected by any one of the level monitoring circuits 23 in the plurality of booster boards 20 which are subjected to the centralized control by the control section 27, the control section 27 that received information of the reduction or the non-reception sends a control signal to the pertinent booster board 20, so that the pumping light Lp is output at the safety level and at the same time, the TLD 26 is subjected to the modulation operation in accordance with the ID pattern generated in the ID pattern generating circuit 24. As a result, the pumping light of the safety level, on which the ID pattern is superposed, is output from the booster board 20 to which the output fiber is erroneously connected. Then, when the pumping light Lp of the safety level containing the ID pattern is received by the light receiver 16 which does not correspond to the pertinent booster board 20, in the amplifier board 10, the anticoincidence of the ID patterns is detected by the ID coincidence detection circuit 25 of the booster board 20 corresponding to this light receiver 16, and information of the anticoincidence is transmitted to the control section 27. To be specific, for the consideration is made on for example the case where the ID pattern of the booster board 20C is detected in the booster board 20B, to cause the anticoincidence of the ID patterns, the control section 27 that received the information of the anticoincidence of the ID patterns from the booster board 20B, sends a control signal to the booster board 20C, so that the wavelength of a TLD 26C is adjusted to the pumping light wavelength to be primarily output from the booster board 20B, and also the output power of the TLD 26C is returned to the normal operation level. As a result, the booster board 20C can automatically output the pumping light Lp, which should have been primarily given to the pumping light input terminal $Tp_B$ to which the output fiber is erroneously connected. Since such a pumping light control by the control section 27 is performed on each of the booster boards 20, it becomes possible to connect the output fiber of arbitrary booster board 20 to each pumping light input terminal Tp of the amplifier board 10, thereby enabling the multi connection of booster boards 20.

Note, in the embodiment and application example of the optical amplifier described above, for the EDFs 11 and 12 of two-stage configuration, the former stage is set to the forward pumping while the latter stage is set to the backward pumping. However, the pumping method for each stage is not limited to the above one example, and the present invention is applicable to EDFs of three or more stages. Further, the one example in which the EDF is used as the amplification medium, however, a rare-earth element doped fiber other than the EDF may be used as the amplification medium. It is possible to apply the present invention to a known optical amplifier which supplies a pumping light to an amplification medium to perform the amplification of a WDM light.

Next, there will be described one embodiment of a terminal station apparatus to which the optical output power automatic attenuation circuit according to the present invention is applied.

In the embodiment and application example of the optical amplifier, there has been shown the one example in which the present invention is applied to the in-line amplifier which collectively amplifies the WDM light. In the present embodiment described below, there will be described one example of a terminal station apparatus to which the present invention is applied for monitoring a connection state of an optical fiber between each of a plurality of channel amplifiers amplifying individually optical signals of respective wavelengths contained in a WDM signal light and a multiplexer multiplexing the optical signals output from the respective channel amplifiers to generate a WDM signal light, to perform level controls of the optical signals output from the respective channel amplifiers.

Figure 13:
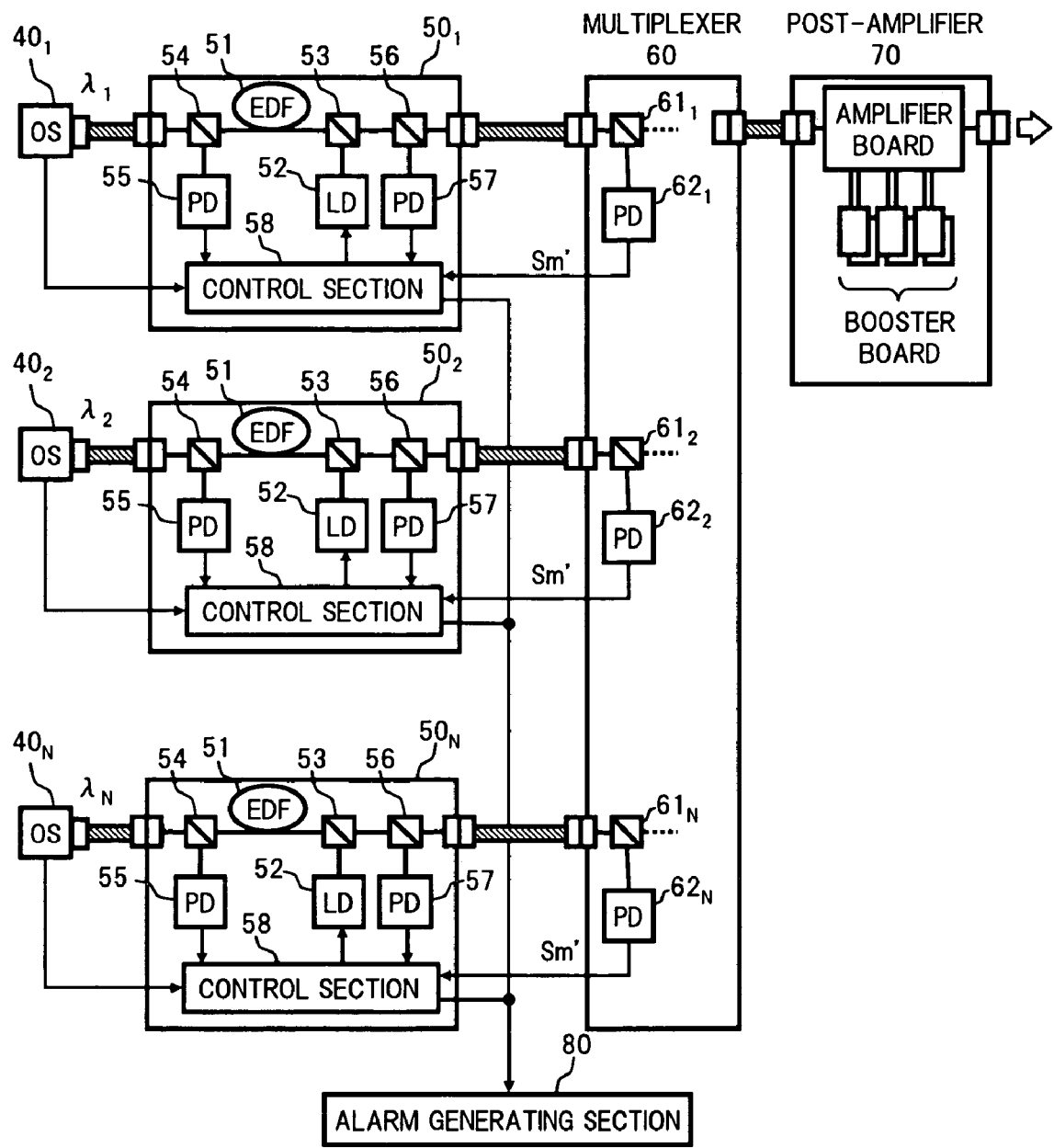
FIG. 13 is a block diagram showing a configuration of one embodiment of a terminal station apparatus to which the optical output power automatic attenuation circuit according to the present invention is applied.

FIG. 13 is a block diagram showing a configuration of the embodiment of the terminal station apparatus.

In FIG. 13, the present terminal station apparatus comprises, for example: N optical senders (OS) $40_1$ to $40_N$ generating optical signals of wavelengths $\lambda_1$ to $\lambda_N$; channel amplifiers $50_1$ to $50_N$ amplifying the optical signals of wavelengths $\lambda_1$ to $\lambda_N$ output from the respective optical senders $40_1$ to $40_N$ for each wavelength; a multiplexer 60 multiplexing the optical signals of wavelengths $\lambda_1$ to $\lambda_N$ which are amplified by the channel amplifiers $50_1$ to $50_N$ to generate a WDM signal light; a post-amplifier 70 collectively amplifying the WDM signal light output from the multiplexer 60; and an alarm generating section 80 that generates an alarm when the erroneous connection occurs between each of the channel amplifiers $50_1$ to $50_N$ and the multiplexer 60.

Each of the channel amplifiers $50_1$ to $50_N$ comprises, for example: an EDF 51; a pumping light source (LD) 52 and a WDM coupler 53, which supply a pumping light to the EDF 51; an optical branching coupler 54 and a light receiver 55 as input monitors; an optical branching coupler 56 and a light receiver 57 as output monitors; and a control section 58. Although not shown in the figure, the control section 58 is provided with functions respectively corresponding to the level monitoring circuit 23, the ID pattern generating circuit 24 and the ID coincidence detection circuit 25, and accordingly, judges a connection state of an output fiber based on an electric signal Sm' indicating the light reception state of the optical signals transmitted from the multiplexer 60 to control the pumping light source 52, thereby avoiding that the optical signal of high power is emitted to the outside at the erroneous connection time and the like.

Note, the channel amplifiers $50_1$ to $50_N$ have amplification bands respectively containing the wavelengths $\lambda_1$ to $\lambda_N$ (slot-free). Therefore, wavelength information of input optical signal is transmitted via an electric signal to the control section 58 of each of the channel amplifiers $50_1$ to $50_N$ from each of the former staged optical senders $40_1$ to $40_N$, and in accordance with the wavelength information, the generation of ID pattern which is different for each channel amplifier is performed in the control section 58.

In the multiplexer 60, optical branching couplers $61_1$ to $61_N$ are inserted to the latter stages of input terminals corresponding to the respective wavelengths $\lambda_1$ to $\lambda_N$, and a part of the optical signal input to each input terminal is branched as a monitor light to be sent to the pertinent one of the light receivers (PD) $62_1$ to $62_N$. Each of the light receivers $62_1$ to $62_N$ receives the branched light from each of the optical branching couplers $61_1$ to $61_N$, to output the electric signal Sm' whose level is changed according to the optical power of the branched light, to the control section 58 of the pertinent channel amplifier.

The post-amplifier 70 collectively amplifies the WDM signal light multiplexed by the multiplexer 60, to send the amplified WDM signal light to a transmission path (not shown in the figure). It is preferable to use the optical amplifier to which the present invention is applied, as shown in FIG. 1 or FIG. 12, as the post-amplifier 70.

In the case where the disconnection/erroneous connection of the output fiber is detected in the control section 58 of each of the channel amplifiers $50_1$ to $50_N$, the alarm generating circuit 80 receives from the control section 58 a signal indicating information of the disconnection/erroneous connection, and outputs to the outside an alarm signal capable of specifying the pertinent channel amplifier or the input terminal which corresponds to the pertinent channel amplifier, of the multiplexer.

In the terminal station apparatus of the above configuration, if a state is such that any one of the output fibers of the channel amplifiers $50_1$ to $50_N$ is disconnected, the optical signal is not received by the pertinent light receiver 62 of the multiplexer 60 and the electric signal Sm' indicating the non-reception state is transmitted from the light receiver 62 to the control section 58 of the channel amplifier. The control section 58 of the channel amplifier whose output fiber is in a disconnection state, judges that the output fiber is not correctly connected to the multiplexer 60, based on the electric signal Sm' from the light receiver 62, to control a driving condition of the pumping light source 52 so that the output power of the optical signal becomes the safety level, and also to subject the pumping light source 52 to the modulation operation in accordance with the ID pattern corresponding to the wavelength information transmitted from the optical sender. As a result, the EDF 51 is pumped with the pumping light of required power, on which the ID pattern is periodically superposed, and the optical signal given to the EDF 51 at a constant input level is propagated through the EDF 51 to become an optical signal of the safety level, on which the ID pattern is superposed, and then output from the output fiber. Further, simultaneously with this, a signal indicating the disconnection state of the output fiber is output from the control section 58 to the alarm generating circuit 80, so that the pertinent alarm signal is output.

Then, when the output fiber of the channel amplifier is connected to the pertinent input terminal of the multiplexer 60, the optical signal of the safety level containing the ID pattern is received by the light receiver 62, and the electric signal Sm' indicating the light reception state is transmitted from the light receiver 62 to the control section 58 of the channel amplifier. The control section 58 detects that the optical signal of the safety level is received on the multiplexer 60 side, based on the electric signal Sm' from the light receiver 62, and also detects that the received ID pattern contained in the electric signal Sm' is coincident with the generated ID pattern, to stop the modulation operation of the pumping light source 52 in accordance with the ID pattern, and also to return the pumping light power to the normal operation level. As a result, the optical signal amplified to a required level by the channel amplifier is sent to the multiplexer 60.

On the other hand, if the output fiber of the channel amplifier is erroneously connected to the impertinent input terminal of the multiplexer 60, since the anticoincidence of the ID patterns is detected in the control section 58 of the channel amplifier corresponding to the impertinent input terminal, the control section 58 judges that the output fiber is not correctly connected to the input terminal of the multiplexer 60 to control the driving condition of the pumping light source 52 so that the output power of the optical signal becomes the safety level, and also to subject the pumping light source 52 to the modulation operation in accordance with the ID pattern corresponding to the wavelength information from the optical sender. As a result, the optical signal of the safety level, on which the ID pattern is superposed, is output from the output fiber. Further, a signal indicating the erroneous connection of the optical fiber is output from the control section 58 to the alarm generating circuit 80, and the pertinent alarm signal is output to the outside.

In the terminal station apparatus as described above, for the ID pattern which is superposed on each of the optical signals of respective wavelengths $\lambda_1$ to $\lambda_N$ in order to enable the detection of erroneous connection of each of the channel amplifiers $50_1$ to $50_N$ to the multiplexer 60, a function of detecting the coincidence/anticoincidence thereof is disposed inside each channel amplifier on the optical signal transmission side. Therefore, differently from the conventional technique shown in FIG. 19, the circuit scale of the reception section (multiplexer 60 here) is not enlarged with an increase of the number of transmission sections (channel amplifiers $50_1$ to $50_N$ here). Further, since the alarm signal is output at the disconnection/erroneous connection time, it is possible to find out at an early time the disconnection/erroneous connection state between each of the channel amplifiers $50_1$ to $50_N$ and the multiplexer 60.

Figure 14:
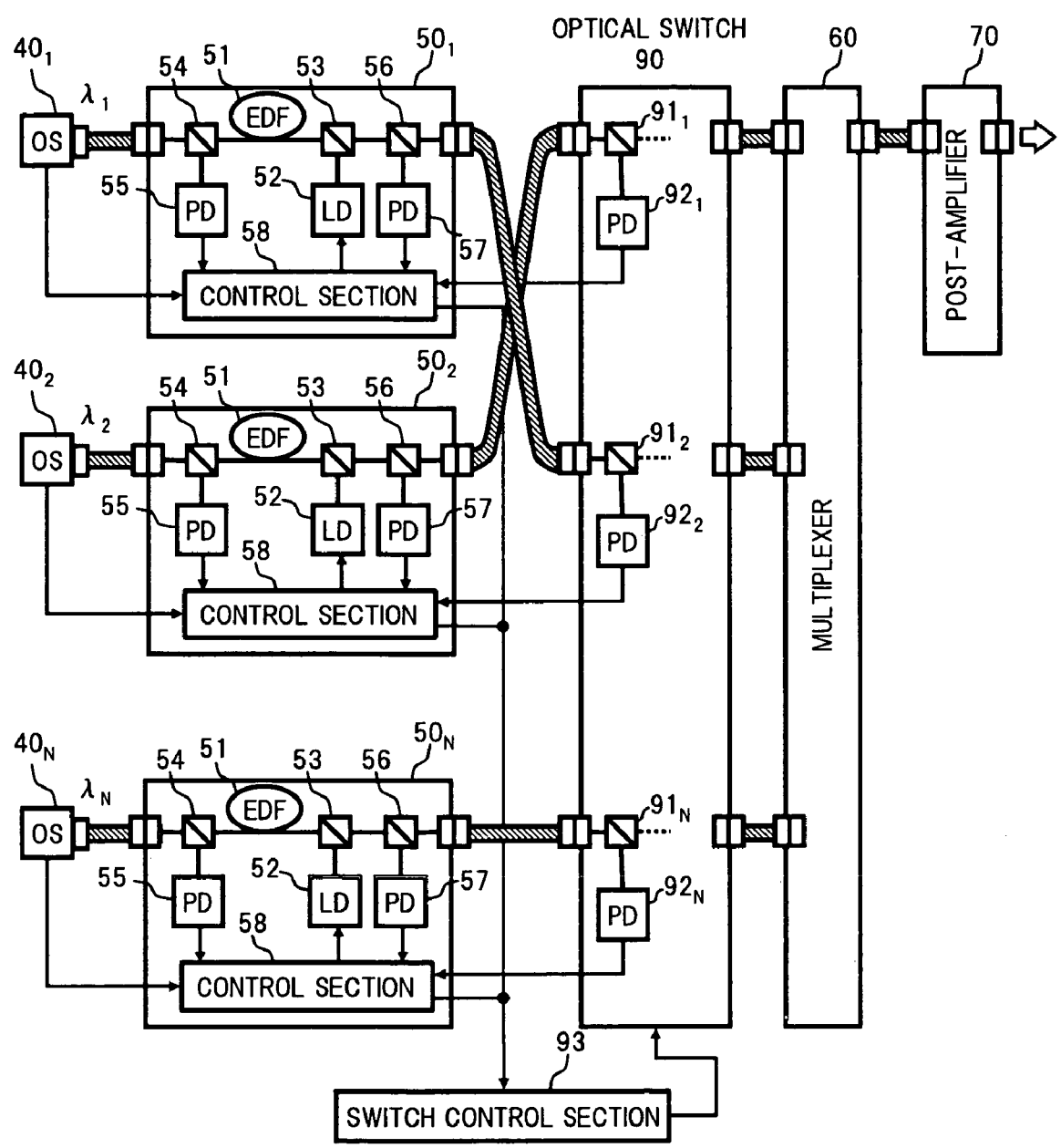
FIG. 14 is a block diagram showing a configuration of an application example related to the terminal station apparatus in FIG. 13.

FIG. 14 is a block diagram showing a configuration of an application example of the above terminal station apparatus.

In FIG. 14, the configuration of the present terminal station apparatus differs from that in FIG. 13 in that an N×N optical switch 90 is disposed between the respective channel amplifiers $50_1$ to $50_N$, and the multiplexer 60, to switch a connection condition between input and output ports of the optical switch according to the result of ID pattern coincidence detection in the control section 58 of each of the channel amplifiers $50_1$ to $50_N$, so that each of the channel amplifiers $50_1$ to $50_N$ and the multiplexer 60 are automatically and correctly connected to each other.

The optical switch 90 includes N input ports and N output ports, and optical branching couplers $91_1$ to $91_N$ are inserted to the latter stages of the respective input ports, so that a part of the optical signal given to each input port is branched as a monitor light to be sent to each of pertinent light receivers (PD) $92_1$ to $92_N$. Each of the light receivers $92_1$ to $92_N$ receives the branched light from each of the optical branching couplers $91_1$ to $91_N$, to output the electric signals Sm' whose current value is changed according to the optical power of the branched light, to the control section 58 of the pertinent channel amplifier. The connection condition between the input and output ports of the optical switch 90 is switched in accordance with a control signal output from a switch control section 93. The switch control section 93 collects the information relating to the results of ID coincidence detection in the control section 58 of the channel amplifiers $50_1$ to $50_N$, to generate the control signal for switching the connection condition between the input and output ports of the optical switch 90 so that the optical signals output from all the channel amplifiers $50_1$ to $50_N$ are given to the input terminals which correspond to the respective wavelengths of the optical signals, of the multiplexer 60.

Note, the optical branching couplers $61_1$ to $61_N$ and the light receivers $62_1$ to $62_N$ as shown in FIG. 13, which are disposed on the latter stages of the respective input terminals, can be omitted from the multiplexer 60 of the present terminal station apparatus.

In the terminal station apparatus as described above, similarly to the terminal station apparatus shown in FIG. 13, the control section 58 of each of the channel amplifiers $50_1$ to $50_N$ detects the disconnection/erroneous connection of the output fiber based on the electric signal Sm' transmitted from the pertinent one of the light receivers $92_1$ to $92_N$, to control the pumping light source 52 so that the optical signal, on which the ID pattern is superposed, is output from the output fiber. Then, the received ID pattern contained in the optical signal which is received by each of the light receivers $92_1$ to $92_N$ of the optical switch 90, and the generated ID pattern are compared in the control section 58 of each of the channel amplifiers $50_1$ to $50_N$, and the detection result of the coincidence/anticoincidence of the ID patterns is transmitted from the control section 58 to the switch control section 93. The switch control section 93 judges which of the input ports of the optical switch 90 the output fiber of each of the channel amplifiers $50_1$ to $50_N$ is connected to, and switches the connection condition between the input port and the output port where the erroneous connection occurs, so that the optical signals output from all the channel amplifiers $50_1$ to $50_N$ are given to the input terminals which correspond to the respective wavelengths of the optical signals, of the multiplexer 60. To be specific, in the connection condition shown in FIG. 14, since the output fiber of the channel amplifier $50_1$ is erroneously connected to the second input port of the optical switch 90, the optical switch control section 93 may control the optical switch 90, so that the first input port of the optical switch 90 is connected to the second output port which is connected to the input terminal corresponding to the wavelength $\lambda_2$ of the multiplexer 60, and also the second input port of the optical switch 90 is connected to the first output port which is connected to the input terminal corresponding to the wavelength $\lambda_1$ of the multiplexer 60.

As described in the above, according to the present terminal station apparatus, even in the case where the output fiber of each of the channel amplifiers $50_1$ to $50_N$ is erroneously connected to the input port of the optical switch 90, it is possible to automatically give the optical signals output from all the channel amplifiers $50_1$ to $50_N$ to the correct input terminals of the multiplexer 60 by performing the switching control on the optical switch 90 according to the results of ID pattern coincidence/anticoincidence detections in the control sections 58 of the channel amplifiers $50_1$ to $50_N$.

Note, in the embodiment and application example of the terminal station apparatus described above, the example has been shown in which the EDF 51 of the channel amplifier is backwardly pumped. However, the pumping method of the EDF is not limited to the above example, and the EDF may be forwardly pumped or bi-directionally pumped. Further, the example has been shown in which the EDF is used as the amplification medium. However, a rare-earth element doped fiber other than the EDF may be used as the amplification medium. Further, it is possible to use a known optical amplifier whose amplification mode is different from that of the rare-earth element doped fiber amplifier.

What is claimed is:

1. An optical output power automatic attenuation circuit for an optical communication apparatus provided with a plurality of transmission sections each outputting a light of previously set power and a reception section including a plurality of optical input terminals which are connected to respective output terminals of said plurality of transmission sections via optical fibers on one-on-one level, wherein the power of the light input to each of the optical input terminals of said reception section is detected by each of a plurality of monitoring sections disposed in said reception section, it is judged whether or not a connection state between each of the output terminals of said plurality of transmission sections and each of the plurality of input terminals of said reception station is normal, based on the detection result in each of said monitoring sections, and when the connection state is not normal, the power of the light output from the pertinent transmission section is attenuated to a predetermined level, said optical output power automatic attenuation circuit comprising, for each of said plurality of transmission sections: an identification information generating section that generates identification information whose pattern is different for each of said transmission sections; an identification information superposing section that superposes the identification information generated in said identification information generating section on the output light; an identification information comparing section that receives an electric signal indicating the detection result in said monitoring section of the power of the light input to the pertinent optical input terminal of said reception section, and compares the identification information contained in said electric signal with the identification information generated in said identification information generating section to detect whether or not they are coincident with each other; and an output power control section that attenuates the power of the output light to the predetermined level when the anticoincidence is detected in said identification information comparing section and then, returns the output light to the previously set power when the coincidence is detected in said identification information comparing section.

2. An optical output power automatic attenuation circuit according to claim 1, wherein said optical communication apparatus is an optical amplifier which collectively amplify a wavelength division multiplexed light containing a plurality of optical signals of different wavelengths, said optical amplifier comprises: an amplifier board including a signal light input terminal and a signal light output terminal to and from which said wavelength division multiplexed light is input and output, amplification mediums connected between said signal light input terminal and said signal light output terminal, and a plurality of pumping light input terminals to which a plurality of pumping lights to be supplied to said amplification mediums are input; and a plurality of booster boards giving the pumping lights output from pumping light sources to the pertinent pumping light input terminals of said amplifier board to supply the pumping lights to said amplification mediums, said plurality of booster boards serves as said plurality of transmission sections, and said amplifier board serves as said reception section, and said identification information superposing section subjects said pumping light source to the modulation operation in accordance with the identification information generated in said identification information generating section, to superpose the identification information on the pumping light.

3. An optical output power automatic attenuation circuit according to claim 2, wherein wavelengths of the pumping light sources of said plurality of booster boards are variable, and there is disposed a wavelength control section that collects the detection results in said respective identification information comparing sections disposed on said plurality of booster boards, and changes the wavelength of the pumping light source of the booster board in which the anticoincidence of the identification information is detected, to the wavelength of the pumping light which should be input to the erroneously connected pumping light input terminal of said amplifier board.

4. An optical output power automatic attenuation circuit according to claim 2, wherein a rare-earth element doped fiber is used as said amplification medium.

5. An optical output power automatic attenuation circuit according to claim 2, wherein said plurality of booster boards each have a redundant configuration.

6. An optical output power automatic attenuation circuit according to claim 1, wherein said optical communication apparatus is a terminal station apparatus comprising: a plurality of optical senders outputting optical signals of different wavelengths; a plurality of channel amplifiers amplifying the optical signals output from said optical senders for each wavelength; and a multiplexer multiplexing the optical signals output from said channel amplifiers to generate a wavelength division multiplexed signal light, said plurality of channel amplifiers serves as said plurality of transmission sections, and said multiplexer serves as said reception section, and said identification information superposing section performs the modulation on an amplification operation of said channel amplifier in accordance with the identification information generated in said identification information generating section, to superpose the identification information on the optical signal.

7. An optical output power automatic attenuation circuit according to claim 6, further comprising;

an alarm generating circuit which collects the detection results in said respective identification information comparing sections disposed on said plurality of channel amplifiers, and generates an alarm signal noting to the outside an abnormality in a connection state between the channel amplifier in which the anticoincidence of the identification information is detected, and said multiplexer.

8. An optical output power automatic attenuation circuit according to claim 6, further comprising:

an optical switch inserted into a plurality of optical paths connecting said plurality of channel amplifiers and said multiplexer, to switch the respective optical paths; and a switch control circuit which collects the detection results of said respective identification information comparing sections disposed in said plurality of channel amplifiers, and switches a connection condition of input and output ports of said optical switch, so that the optical signal output from the channel amplifier in which the anticoincidence of the identification information is detected is input to the input terminal which corresponds to the wavelength of the optical signal, of said multiplexer.

9. An optical output power automatic attenuation circuit according to claim 6, wherein rare-earth element doped optical fiber amplifiers are used as said plurality of channel amplifiers.

10. An optical output power automatic attenuation circuit according to claim 6, wherein said terminal station apparatus is provided with a post-amplifier which collectively amplifies the wavelength division multiplexed light output from said multiplexer.

* * * * *

UNITED STATES PATENT AND TRADEMARK OFFICE
CERTIFICATE OF CORRECTION

PATENT NO. : 7,136,584 B2
APPLICATION NO. : 11/085543
DATED : November 14, 2006
INVENTOR(S) : Keisuke Harada et al.

It is certified that error appears in the above-identified patent and that said Letters Patent is hereby corrected as shown below:

Column 20, Line 36, change "noting" to --notifying--.

Signed and Sealed this

Thirteenth Day of March, 2007

JON W. DUDAS
*Director of the United States Patent and Trademark Office*